(12) United States Patent
Wilson et al.

(10) Patent No.: US 8,144,666 B2
(45) Date of Patent: Mar. 27, 2012

(54) DOWNLINK BEAMFORMING FOR BROADBAND WIRELESS NETWORKS

(75) Inventors: Fiona Wilson, Bishops Stortford (GB); Keith Wilson, Bangkok (TH)

(73) Assignee: Rockstar Bidco LP, New York, NY (US)

( * ) Notice: Subject to any disclaimer, the term of this patent is extended or adjusted under 35 U.S.C. 154(b) by 690 days.

(21) Appl. No.: 11/417,736

(22) Filed: May 4, 2006

(65) Prior Publication Data

US 2006/0281494 A1      Dec. 14, 2006

(30) Foreign Application Priority Data

May 13, 2005 (GB) .................................. 0509820.7
Jun. 20, 2005 (GB) .................................. 0512498.7

(51) Int. Cl.
*H04W 4/00* (2009.01)
*H04B 7/212* (2006.01)
*G05B 13/02* (2006.01)

(52) U.S. Cl. .......................... 370/334; 370/347; 700/53

(58) Field of Classification Search .................. None
See application file for complete search history.

(56) References Cited

U.S. PATENT DOCUMENTS

| | | | | |
|---|---|---|---|---|
| 6,694,155 | B1 * | 2/2004 | Chin et al. | 455/562.1 |
| 6,718,184 | B1 * | 4/2004 | Aiken et al. | 455/562.1 |
| 6,788,661 | B1 * | 9/2004 | Ylitalo et al. | 370/334 |
| 6,952,460 | B1 * | 10/2005 | Van Wechel et al. | 375/350 |
| 7,206,608 | B1 * | 4/2007 | Wu et al. | 455/562.1 |
| 7,620,019 | B1 * | 11/2009 | Smith et al. | 370/334 |
| 2002/0090978 | A1 * | 7/2002 | Petrus et al. | 455/562 |
| 2004/0082356 | A1 * | 4/2004 | Walton et al. | 455/522 |
| 2004/0235472 | A1 * | 11/2004 | Fujishima et al. | 455/434 |
| 2005/0101264 | A1 * | 5/2005 | Farlow et al. | 455/84 |
| 2005/0113116 | A1 * | 5/2005 | Avidor et al. | 455/456.5 |
| 2006/0019709 | A1 * | 1/2006 | Kim et al. | 455/562.1 |
| 2006/0067269 | A1 * | 3/2006 | Jugl et al. | 370/329 |

* cited by examiner

*Primary Examiner* — Rafael Pérez-Gutiérrez
*Assistant Examiner* — Frank Donado
(74) *Attorney, Agent, or Firm* — Barnes & Thornburg LLP

(57) ABSTRACT

Spatial Division Multiple Access (SDMA) offers multiplicative spectral efficiency gains in wireless networks. An adaptive SDMA beamforming technique is capable of increasing the traffic throughput of a sector, as compared to a conventional tri-cellular arrangement, by between 4 and 7 times, depending on the environment. This system uses an averaged covariance matrix of the uplink signals received at the antenna array to deduce the downlink beamforming solution, and is equally applicable to Frequency Division Duplex (FDD) and Time Division Duplex (TDD) systems. A scheduling algorithm enhances the SDMA system performance by advantageously selecting the users to be co-scheduled.

25 Claims, 6 Drawing Sheets

(a)    (b)    (c)

DOWNLINK BEAMFORMING FOR BROADBAND WIRELESS NETWORKS

BACKGROUND OF THE INVENTION

1. Field of the Invention

This invention relates to beamforming in the downlink in a cellular radio environment. In particular, this invention relates to adaptive beamforming using an antenna array at a base station and preferably single antennas at the respective user equipment (UE), with the object of improving cell throughput.

2. Description of the Related Art

Antenna array processing techniques are a key enabler for achieving the cell throughput and availability of high data rates which are likely to be required for future broadband wireless systems. Improvements in spectral efficiency may be achieved by exploiting the spatial dimension. To this end, uplink beamforming techniques are known, for example, from T. S. Rappaport, "Smart Antennas, Selected Readings" Piscataway, N.J.: IEEE, 1998 and J. E. Hudson, "Adaptive Array Principles", IEE, 1980.

However, hitherto, much less work has been carried out on the more challenging, downlink beamforming case.

Beamforming techniques can be categorised as fixed/switched beam or adaptive beam. In the fixed/switched beam approach, a set of narrow beams is pre-defined. For each user, the most appropriate beam is chosen and the signal for that user is transmitted on the chosen beam. In the adaptive beam approach, the beam shape is not chosen from a set of fixed alternatives but is instead calculated specifically for each user. Although more complex to implement, fully adaptive beams provide greater opportunity for performance gains than fixed/switched implementations because they more accurately track the dynamics of the distribution of users within the cell.

Both the fixed/switched beam and adaptive beam categories can be further subdivided into single user or space division multiple access (SDMA) techniques. In the first case, the bandwidth assigned to each user cannot be re-used within the same sector. A beam is formed within the cell or sector of interest which concentrates the radiated energy towards the wanted user and hence minimises the interference to neighbouring cells. In the case of SDMA, the same bandwidth can be re-used within the sector providing the users are spatially differentiated. This gives rise to parallelism and hence is very effective in multiplying the spectral efficiency of the sector.

SUMMARY OF THE INVENTION

Spatial Division Multiple Access (SDMA) offers multiplicative spectral efficiency gains in wireless networks. An adaptive SDMA beamforming technique is capable of increasing the traffic throughput of a sector, as compared to a conventional tri-cellular arrangement, by between 4 and 7 times, depending on the environment. The system described below may use an averaged covariance matrix of the uplink signals received at an antenna array to deduce a downlink beamforming solution, and is equally applicable to Frequency Division Duplex (FDD) and Time Division Duplex (TDD) systems. A scheduling algorithm may enhance the SDMA system performance by advantageously selecting the users to be co-scheduled. Using an SDMA system which uses adaptive beamforming provides significant cell capacity gains on both the up and down links. Although it will be appreciated that the concepts described here are more broadly applicable, the focus of the present description is upon systems which employ Orthogonal Frequency Division Multiplexing (OFDM) such as those proposed in the IEEE 802.16 standards.

Downlink beamforming in an FDD environment is particularly challenging because the downlink channel is not explicitly known at the base station transmitter. Measurements of the downlink propagation channel may be fed back from the user equipment but this places stringent requirements on the downlink pilot provision and uplink signalling bandwidth and thus is undesirable. Alternatively, the uplink channel, as measured at the base station receiver, can be used to deduce partial downlink channel knowledge and it is this second method which is preferred and described in detail below.

The system has been designed to complement other spatial processing technologies. For example, MIMO transmission and diversity reception in conjunction with beamforming, may be accommodated by a dual-polar antenna design as described below. These techniques should offer multiplicative gains in combination with the SDMA adaptive beamforming proposed.

According to a first aspect of the invention there is provided a method of forming beams for communicating over a base station downlink with a plurality of user equipment in a cellular radio network comprising receiving transmissions from a plurality of user equipments, determining an angle of arrival for each respective user equipment transmission, forming a scheduler set comprising the identities of user equipment scheduled for simultaneous transmission based on the determined angles of arrival, and processing information derived from the received transmissions for the user equipment identified in the scheduler set to determine beam weightings for the downlink to each user equipment in the scheduler set.

The beam weightings may then be fed to an antenna array to radiate the beams.

In a second aspect, there is provided a base station for a cellular radio network comprising a scheduler for determining a scheduler set of user equipments in the cellular radio network to be serviced at the same time, a beamformer arranged to generate a plurality of beams based on information derived from signals received in the uplink from user equipment in a scheduled set determined by the scheduler, and an antenna operable to transmit the plurality of beams.

In a further aspect, there is provided an adaptive beamformer for a FDD cellular radio downlink comprising a first input for receiving uplink information related to uplink transmissions from user equipment, a beam weightings generator arranged to process the uplink information to generate beam weightings and a weightings output arranged to output the generated weightings for transmission of adaptive beams by an antenna array.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings in which.

DETAILED DESCRIPTION OF THE INVENTION

An adaptive beam, SDMA system architecture, is described below followed by a high level description of hardware which may be used to implement the proposed system. The requirements such a system places upon antenna design is also discussed.

The results of a set of system simulations are then presented which illustrate the performance gain in different propagation environments ranging from benign to urban; the influence of the scheduler; the impact of realistic implementation errors; and a comparison with alternative fixed and adaptive beamforming schemes.

System Architecture

Figure 1:
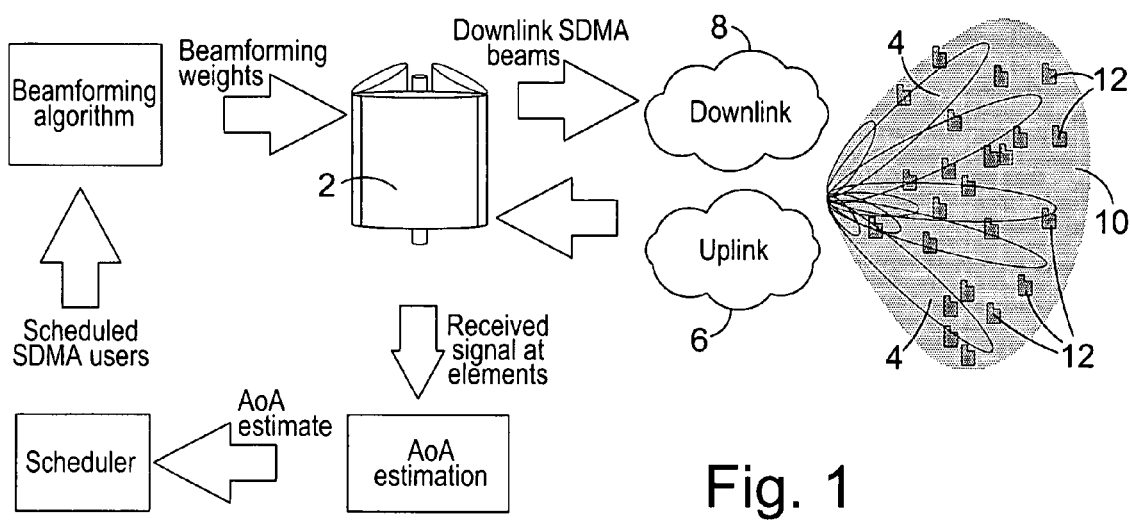
FIG. 1 shows an exemplary system architecture.

FIG. 1 shows a possible system architecture in block diagram form. The system is based upon a close-spaced, crosspolar linear array 2, which is used to radiate beams 4 on both the uplink 6 and downlink 8. The array 2 carries user-specific traffic on beams which track the desired UEs 12 movements whilst forming nulls towards interfering UEs. The same array 2 also carries broadcast and signalling traffic on a synthesised conventional sector pattern which is referred to below as an overlay beam 10. This synthesised sector defines the coverage area of the sector and hence the pool of active, eligible UEs.

The apparent azimuth position of the active users is calculated from the averaged received uplink signal and is used firstly to determine the schedule for offering service to each active user and secondly to calculate the downlink beam weights. Thus the beamforming algorithm works upon the averaged channel rather than attempting to track the instantaneous channel. Although not theoretically optimum, this has been found to offer robust performance in realistic scenarios and greatly reduces processing demands in the beamformer.

Determining the Angle of Arrival

The pilot signal from each of the active UEs within the coverage area is received across the columns of the linear array. It is assumed that each UE can be identified by a unique pilot sequence. A swept beam algorithm is used to determine the angle of arrival (AoA) of that UE's pilot signal. In the presence of multipath, the signal will be received over a spread of angles. The swept beam algorithm determines the direction from which maximum power is received. This is achieved using a succession of weight sets $W_i$ which represent sin x/x conventional beams, where x is the azimuth pointing angle, pointed between ±60° in 1° steps. The pointing angle of the weight set which maximises $$W_i^H \cdot \check{R}_{ss}^i \cdot W_i$$

is selected and defines the angle of arrival, where $\check{R}_{ss}^i$ is the uplink signal-only covariance matrix of the $i^{th}$ user and $^H$ denotes the Hermitian transpose. This Angle of Arrival (AoA) estimate is used only for the purposes of scheduling UEs as described in detail in our co-pending U.S. application Ser. No. 10/928,454 (17016ID)

SDMA Scheduling

A key aspect of any SDMA system is the scheduling algorithm. A suitable scheduler is described in our co-pending U.S. application Ser. No. 10/928,454 (17016ID) the contents of which is incorporated herein by reference. The scheduler determines which UEs, from the pool eligible for service in the next scheduled slot, are to be simultaneously served using SDMA. These UEs share the same bandwidth allocation and therefore are differentiated only by their spatial signature. A scheduling algorithm, which we have named the 'ordered bearing scheduler', which attempts to maximise the azimuth angle between co-scheduled UEs is used. In this algorithm, the UEs eligible for service in the next scheduling window are listed in order of their approximate AoA as calculated from the swept beam (or 'scanning beam') algorithm. For Round Robin (RR) slot allocation, UEs are entered once in the list, for Equal Throughput (EQT) allocation they may need to be entered several times as described in our co-pending U.S. application Ser. No. 11/318,807 (17605ID).

Figure 2:
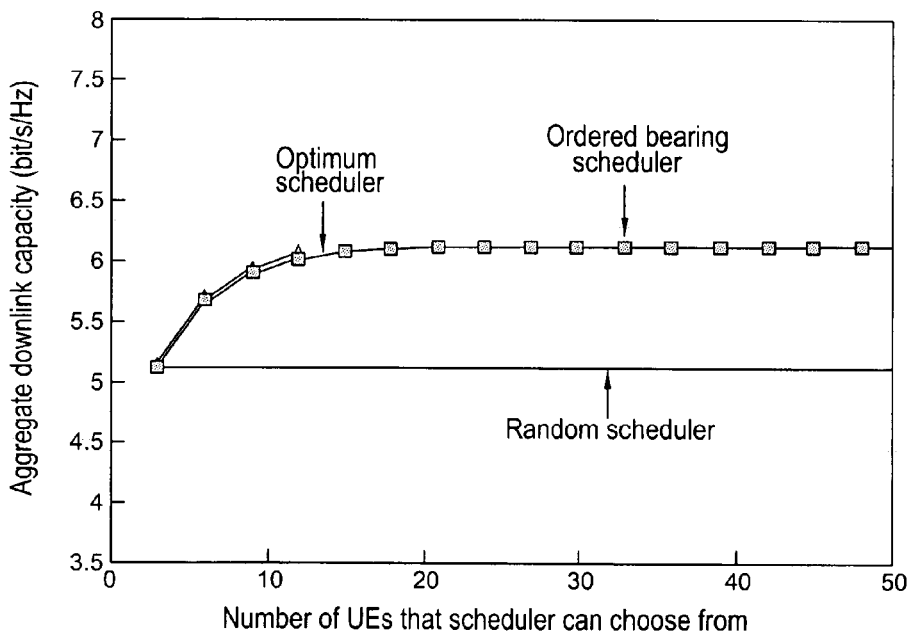
FIG. 2 is a simulated plot of aggregate downlink sector capacity, for 3 users scheduled at a time.

The list is then equally partitioned into the desired number of SDMA beams and the first UE from each sub-list co-scheduled, and then the second UE from each sub-list is co-scheduled, continuing in this manner to the last entry in each sub-list. This algorithm has been shown, through simulation, to approximate the performance of an exhaustive search of all possible combinations to find the optimum. FIG. 2 compares the downlink sector throughput for three different schedulers versus the total population of UEs, and has been simulated on the basis that all UEs are allocated the same number of timeslots i.e. Round Robin, and must be scheduled in groups of three. The graph shows that an efficient scheduler offers significant performance gain over random UE selection. It also shows the performance of the ordered bearing scheduler closely approximates the theoretical optimum.

Downlink Beamforming Algorithm

The uplink signal from each column of the array, corresponding to each of the group of UEs to be co-scheduled using SDMA, is provided to the downlink beamforming algorithm. Several beamforming weight algorithms have been investigated:

Swept beam

Maximum Eigenvector

Swept beam with nulling

Maximum Eigenvector with nulling

Of these, Maximum eigenvector with nulling gave the best performance and is the preferred algorithm. The downlink weights for the $i^{th}$ user are defined by $$W_i = \alpha (\check{R}_{nn}^i)^{-1} V_{MAX}^i$$

where α is a scalar multiplier, which is chosen to ensure that the total power transmitted to each UE remains constant, $\check{R}_{nn}^i$ is the uplink interference plus noise covariance matrix, excluding the $i^{th}$ user and $V_{MAX}^i$ is the eigenvector associated with the largest eigenvalue of, $\check{R}_{ss}^i$.

Multiplication of the weights by $\check{R}_{nn}^{-1}$ has the effect of adding nulling. This is optional. $\check{R}_{nn}$ is the interference and noise covariance matrix which includes SDMA interferers but not the wanted signal and $\check{R}_{ss}^i$ is the uplink signal-only covariance matrix of the $i^{th}$ user.

$$R_{nn}^i = \sum_{j \neq i} R_{ss}^j + \sigma_n^2 I$$

The weights, as calculated for each UE, are applied to the downlink signals on the columns of the array. Thus, the user traffic for each UE is carried on downlink beams, directed towards the wanted UE, with nulls towards the co-scheduled, SDMA UEs. The nulling is optional but preferred.

Alternative beamforming weight algorithms are also possible and a further example is the Swept Beam algorithm. This algorithm is based on the weight set $W_i$ which is derived in the same manner as has been proposed for determining the AoA of the UEs pilot signal. It is the set of weights that maximise the quantity:

$$W_i^H \cdot \check{R}_{ss}^i \cdot W_i$$

Where $W_i$ represents sin x/x conventional beams pointed between ±60° in 1° steps. The downlink weights for the $i^{th}$ user are thus defined by $W_i$ scaled by a constant $\alpha$ which ensures the total power remains constant. Nulling may also be applied to this algorithm by pre-multiplying the weights by $\check{R}_{nn}^{-1}$ as described above. It will be appreciated that other angular ranges and step sizes may be used for the swept beam algorithm.

Beamforming in a FDD Network

By using the covariance matrix of the received signals, averaged over time, we are choosing to form the downlink beam based upon the directions of the main signal returns but discarding the exact phase of each multipath return. Thus, this system exploits the observation from propagation trials that, although the phase of the multipath signals is uncorrelated across the frequency duplex spacing, the dominant reflectors do not change between the frequencies. Using this method, there is no requirement for the UE to feed back detailed channel measurements to the base station, a procedure which is difficult for all but the most benign or slowly evolving of channels.

Forward Link Signalling

Figure 3:
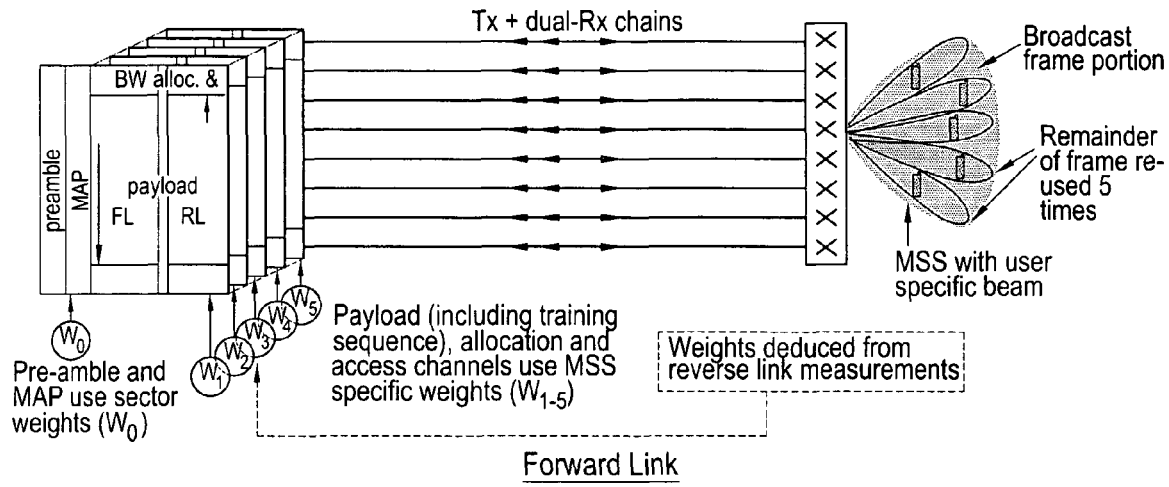
FIG. 3 is a diagram showing possible forward link signalling.

A diagram of possible forward link signalling is shown in FIG. 3 using the IEEE 802.16e standard (so-called "WiMAX") as a basis. Although a TDD frame is illustrated, the adaptive beam system is equally applicable to FDD.

Some parts of the frame are broadcast using the overlay beam (synthesised by applying appropriate weights to the typically 8-column antenna facet). Typically these would be:—

Preamble

FL/RL MAP [The Media Access Protocol {MAP} specifies when physical layer transitions (modulation and FEC changes) occur within the subframe]

Payload to UE which cannot interpret Adaptive Antenna System (AAS) signalling (optional)

Parts of the bandwidth allocation and access procedure where the UE AoA is not yet reliably known The remainder of the frame is individually beamformed as described above, to multiple simultaneous users:—

Payload (excluding any non-AAS reserved portion)

Allocation and access signalling where UE AoA has been estimated

Each forward link data burst is typically preceded by a forward link training (FLT) sequence aiding channel estimation at the UE.

Reverse Link Signalling

Figure 4:
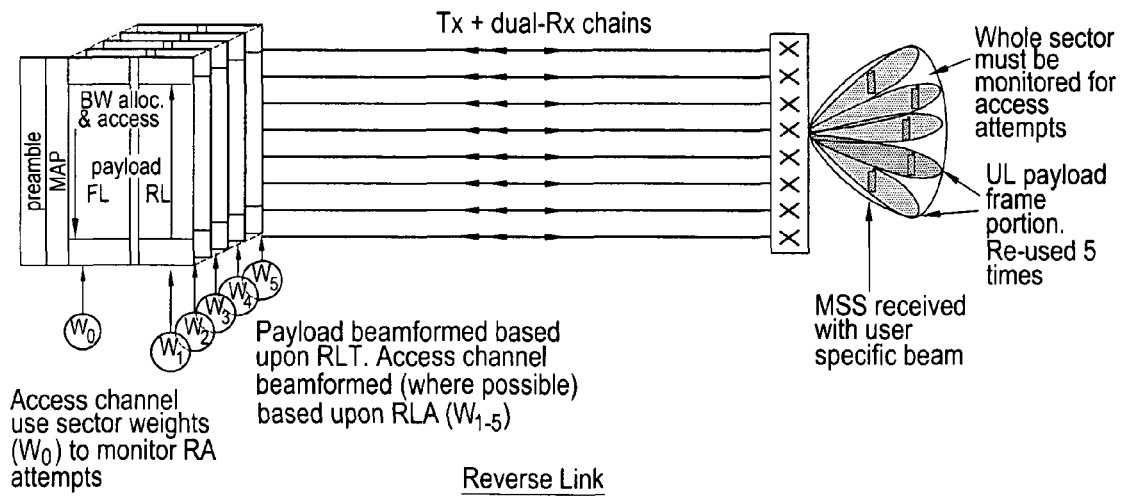
FIG. 4 is a diagram showing possible reverse link signalling.

This is illustrated in FIG. 4 assuming that majority of the exemplary 802.16 frame carries data from 5 simultaneous (SDMA) users.

Typically, each reverse link data burst is preceded by an RLT (Reverse Link Training) sequence, to allow the Base Station (BS) to adapt its reverse and forward link beamforming weights.

The random access portion of the frame is not beamformed until a valid RLA (Reverse Link Access) sequence is detected. Bandwidth requests are random access. Furthermore, each request is preceded by a training sequence; the RLA, which the BS can then use to adapt the reverse link weights.

Figure 5:
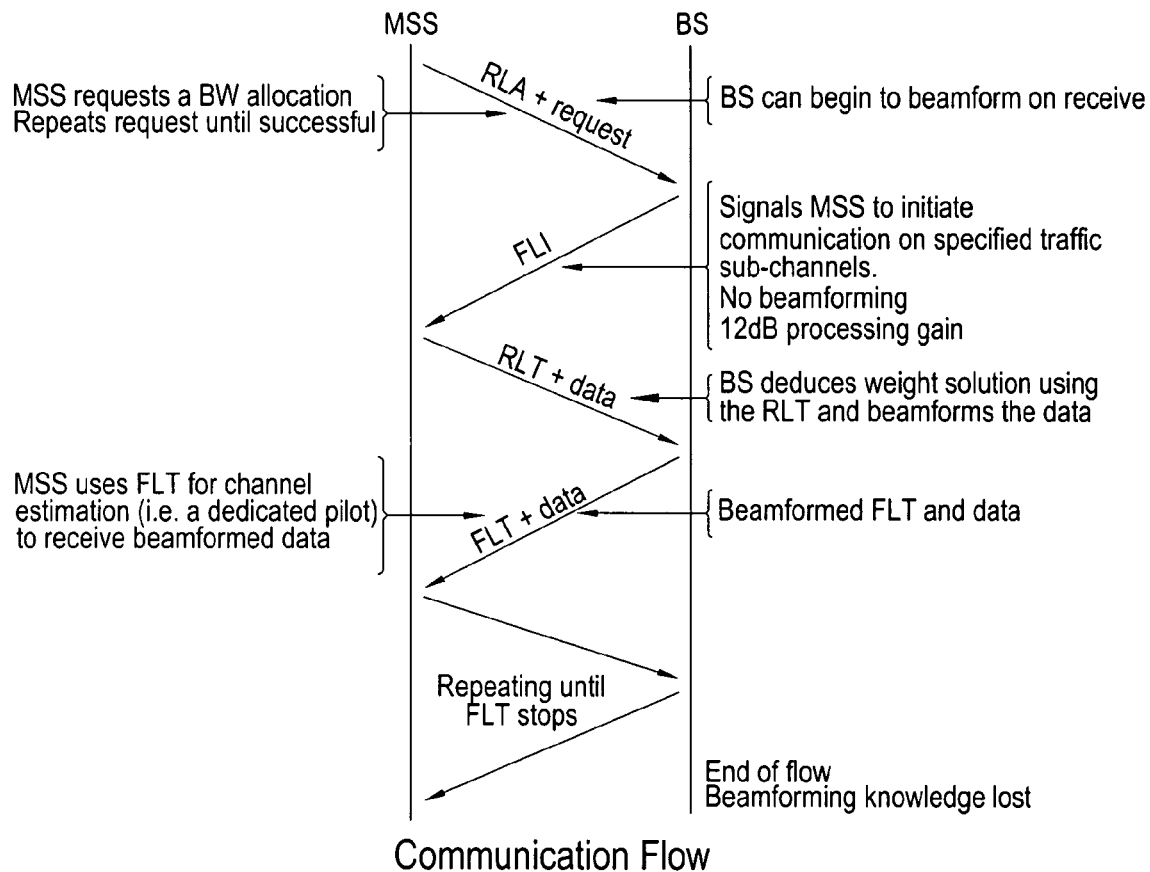
FIG. 5 is a communication flow diagram.

This is summarised in the communication flow diagram of FIG. 5.

In the context of the 802.16e standard, implementation of the beamforming arrangement set out above has implications for the physical layer processes which are briefly set out below. It will be appreciated that similar considerations will apply to other cellular radio networks.

Adaptive Modulation and Coding (AMC)

The user Equipment (UE) which is generally equivalent to a Mobile Subscriber Station (MSS) measures and reports the inter-cell interference environment but cannot predict the intra-cell SDMA interference.

The BS has overall control and dictates the burst profile the UE receives on the forward link.

For the SDMA case, the BS must combine the reported Channel Quality Indicator (CQI) with its knowledge of the scheduled beamforming solution to estimate the channel quality.

The UE only alerts the BS if the CQI is outside a range defined by the BS. The BS must therefore calculate this range taking into account the likely additional, unmeasured interference due to intra-cell (SDMA) interference.

Mobility and Handoff

Every BS broadcasts own base and neighbouring base information across the whole sector. (Assumes AAS is not required for coverage)

UE estimates the channel quality to neighbour cells.

UE reports scan results and a Hand Off (HO) can then be instigated by UE, BS or the network.

Three forms of HO are allowed in 802.16e and all can be used with AAS:

HO—normal hard handover

Soft HO (SHO)—Transmit/receive data from multiple BS

Fast BS Switching (FBSS) HO—monitor and synchronise with multiple BSs but transmit/receive data from one BS at a time (i.e. fast BS selection)

Beamforming only begins once a bandwidth allocation is requested and the data exchange begins.

In the case of FBSS HO, every member of the BS active set shall monitor the RLT so that FL beamforming can be applied instantaneously on change of anchor BS.

Hardware Overview

Figure 6:
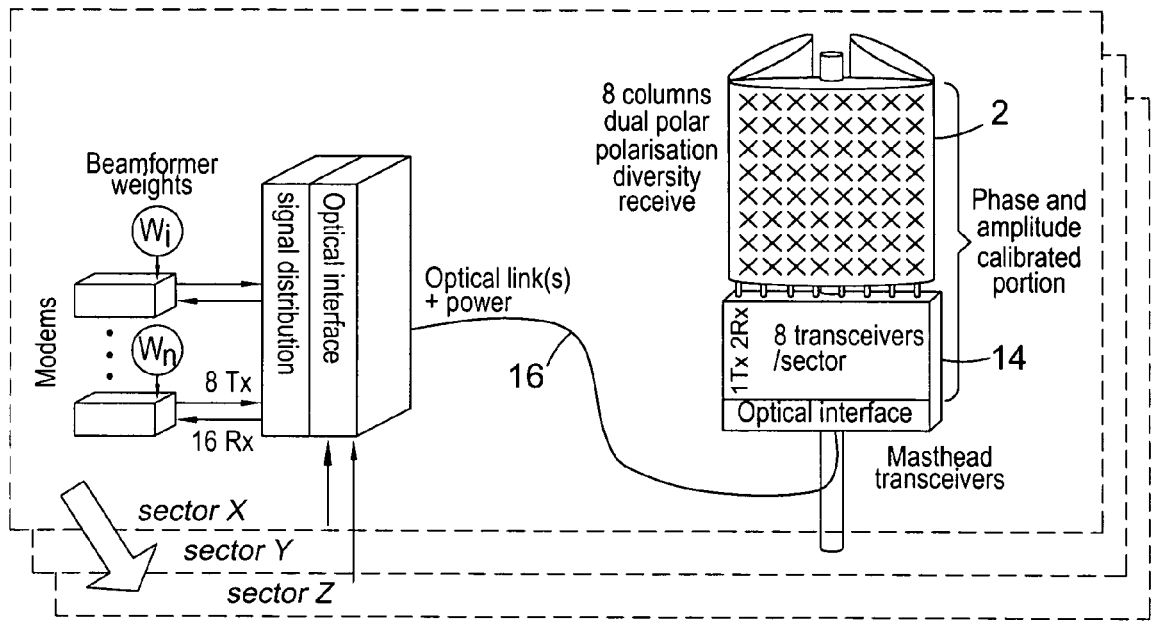
FIG. 6 is a simplified hardware block diagram.

With reference to FIG. 6, the basis of the preferred SDMA system hardware is an 8-column, linear antenna array 2 which is used for both transmission and reception. The columns of the array are close-spaced ($\lambda/2$), where $\lambda$=centre wavelength of the band, if TDD or between the two bands if FDD. Dual-polar antenna elements (shown as diagonal cross-polar) are used allowing 2-branch MIMO or diversity to be used in combination with SDMA beamforming. It will be appreciated that other antenna arrangements are possible.

Each column of the array must have a separate transmit chain and, assuming receive diversity over two polarisations, two receive chains. Accurate amplitude and phase calibration should be maintained across the transmit chains and across the receive chains from the digital beamformer to the antenna.

Figure 7:
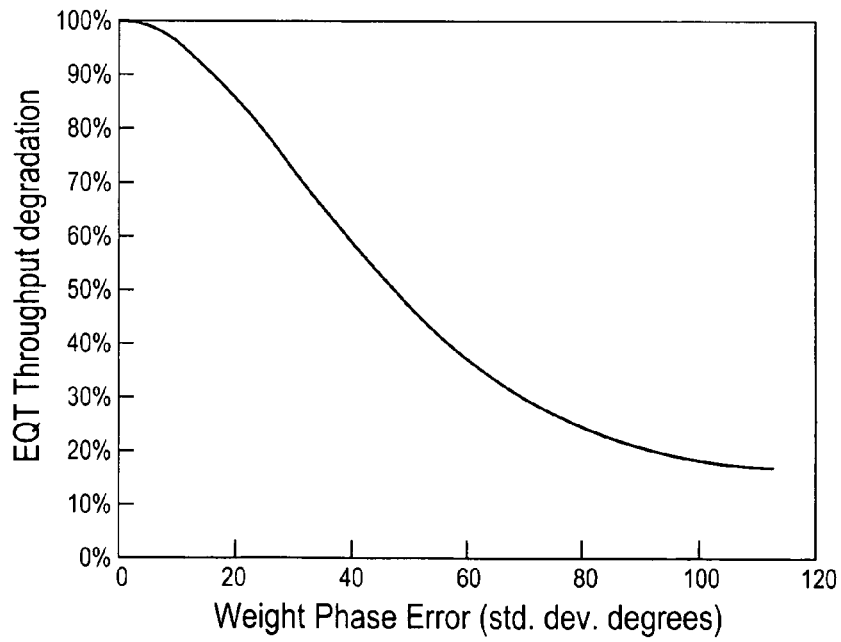
FIG. 7 is a simulated plot showing the impact of calibration error on downlink sector throughput.

FIG. 7 shows the impact of imperfect hardware calibration on the adaptive beam sector throughput. To maintain 97% of the ideal capacity, weight errors should be <8°. To constrain calibration requirements and cost and weight of the feeder cables, tower top transceivers 14 may be used. This ensures the calibrated portion of the hardware is contained within the masthead enclosure and replaces numerous bulky RF feeder cables with a high speed digital connection 16.

Performance Analysis

Figure 8:
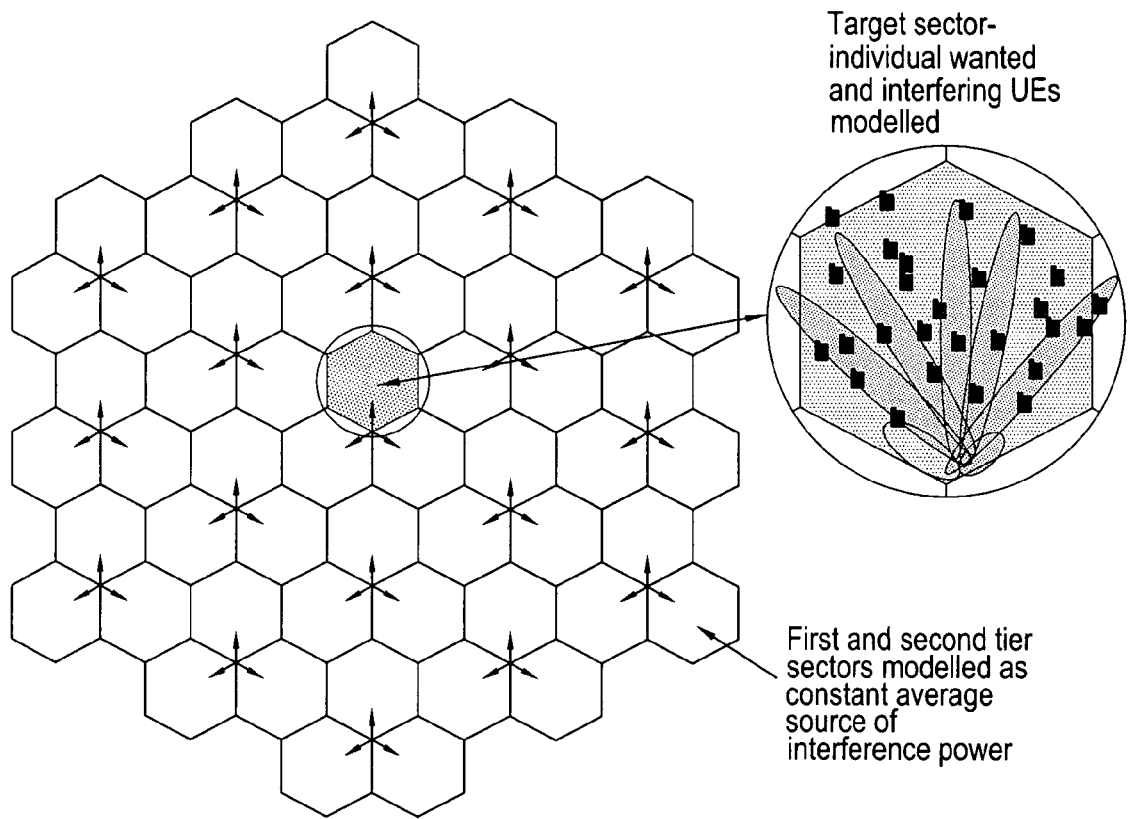
FIG. 8 shows the network layout used for simulation FIG. 9(*a*) shows a tri-cellular beam configuration, FIG. 9(*b*) shows a 9-beam multibeam beam configuration, FIG. 9(*c*) shows a SDMA adaptive beam beam configuration SDMA adaptive beam.

The performance of the proposed system has been investigated by Monte-Carlo simulation. The simulation tool fully models the wanted and interfering signals in a single sector of a network. The downlink interference and noise environment, assuming a 19-cell, regular tri-cellular network, has been modelled for 10,000 UE positions. The first and second tier bases are modelled as constant, averaged sources of interference power. The simulated network is shown in FIG. 8.

On each iteration of the model, a given number of UEs (100 used for this simulation) is randomly selected to represent a typical population in the central sector. The scheduling algorithm is applied to place the UEs in sub-groups equal to the number of beams, based on the AoA estimated from the uplink. The 3GPP Spatial Channel Model (3GPP SCM) is used to provide uplink and downlink channels, appropriate to the environment under investigation. The uplink channel to each UE is generated, and a weight solution derived for each UE based on this. The downlink channel is then created for each UE, using the same scattering centres but randomised signal phases as the corresponding uplink channel, and this is used to calculate the actual SNIR (Signal to Noise plus Interference Ratio) received by each UE. The scheduler continues until all UEs have received the requisite amount of data, and then the next iteration is started. The simulation was repeated until convergence was reached in terms of simulation noise being reduced to within the quoted accuracy of the results. The main simulation parameters are given in Table I.

TABLE I

KEY SIMULATION PARAMETERS

| PARAMETER | SETTING |
| --- | --- |
| Network layout | 19-cell tricellular |
| Propagation law | $R^2 < 200$ m |
|  | $R^{3.8} > 200$ m |
| Base spacing | 750 m |
| Log normal fading sigma | 10 dB |
| UE antenna pattern | omni |
| Active UEs per sector | 100 default |
| Bandwidth sharing | Equal Throughput (EQT) |
|  | Or Round Robin (RR) |
| SDMA Scheduler | Ordered Bearing |
| Area Outage Allowed | 5% (for EQT) |
| Duplexing | FDD |

Simulation Results

Figure 9:
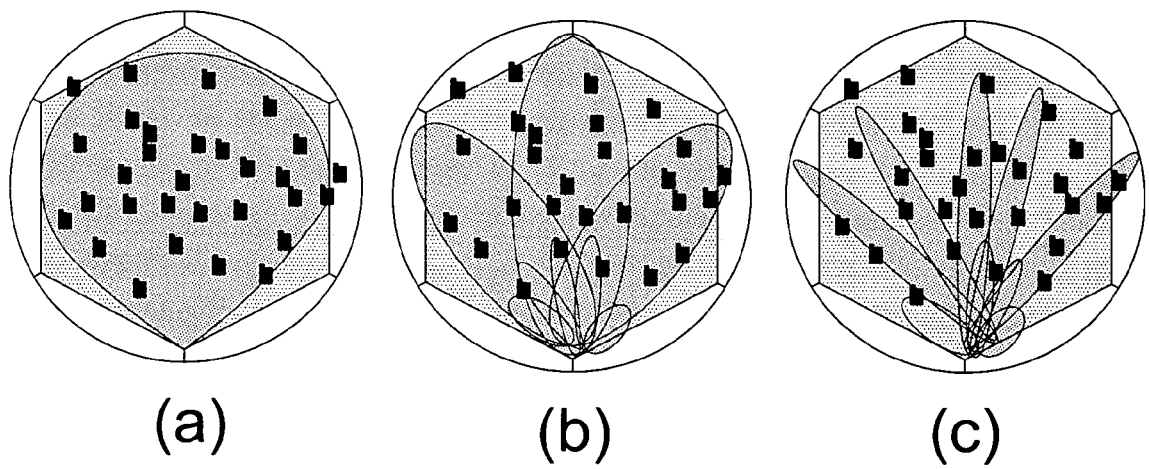

Assuming each UE achieves Shannon capacity given their calculated SINR, the sector throughput is calculated and compared with the throughput of
  Conventional tri-cellular
  9-beam fixed multibeam (assumes an 6-column facet)
The beam configurations are illustrated in FIG. 9, with 9(a) showing a tri-cellular arrangement, 9(b) showing a 9-beam multibeam and 9(c) showing an SDMA adaptive beam arrangement.

Figure 10:
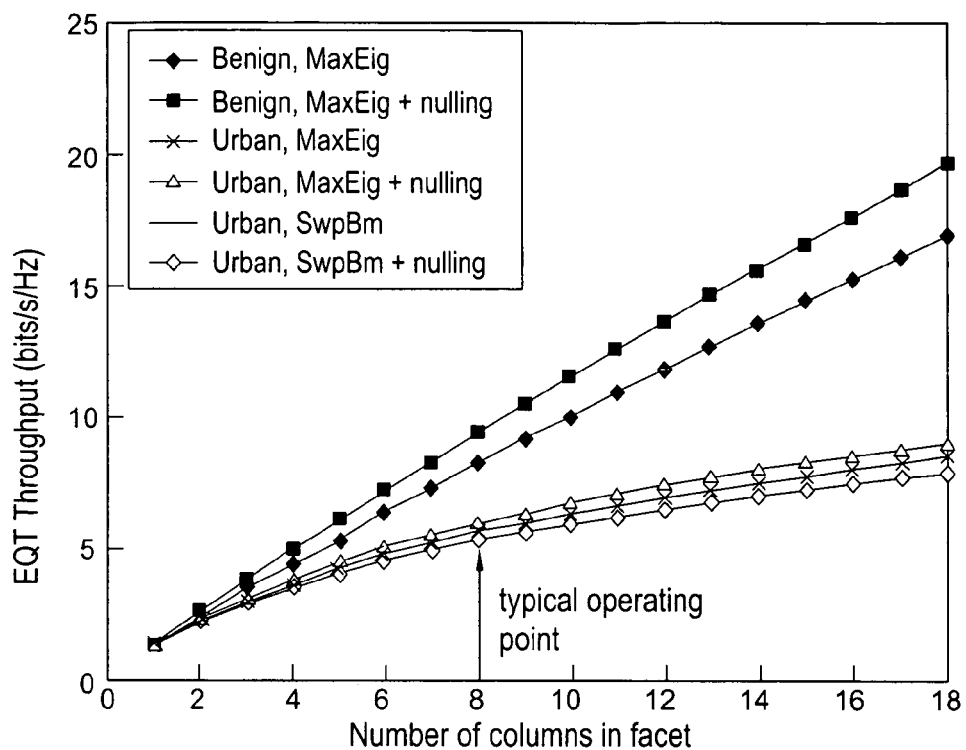
FIG. 10 is a plot of sector throughput versus number of columns in facet for various algorithms in benign and urban environments.

In FIG. 10, the sector throughput is plotted against the number of columns in the antenna array for various algorithms and environments. In each case the optimum number of beams is chosen for the size of array. In a benign environment, devoid of multipath and hence with no angle spread, there is no performance difference between Maximum eigenvector and Swept Beam beamforming. The use of nulling gives an appreciable improvement in spectral efficiency. In the absence of angle spread, the cell throughput continues to rise quite steeply with the number of columns; each additional degree of freedom in the array allowing another beam to be successfully formed. The limited population of active users does, however, begin to impact performance with very large arrays which are supporting many simultaneous users.

In the urban environment, angle spread limits the spatial resolution that can be achieved, regardless of the size of array. In this case, the advantages of an ever increasing array size are limited, so we propose an 8-column array as giving good performance with a practical array size. The Eigenvector with Nulling algorithm gives the highest throughput although the performance of all the algorithms set out above is reasonably similar and should be considered encompassed by the present invention.

Figure 11:
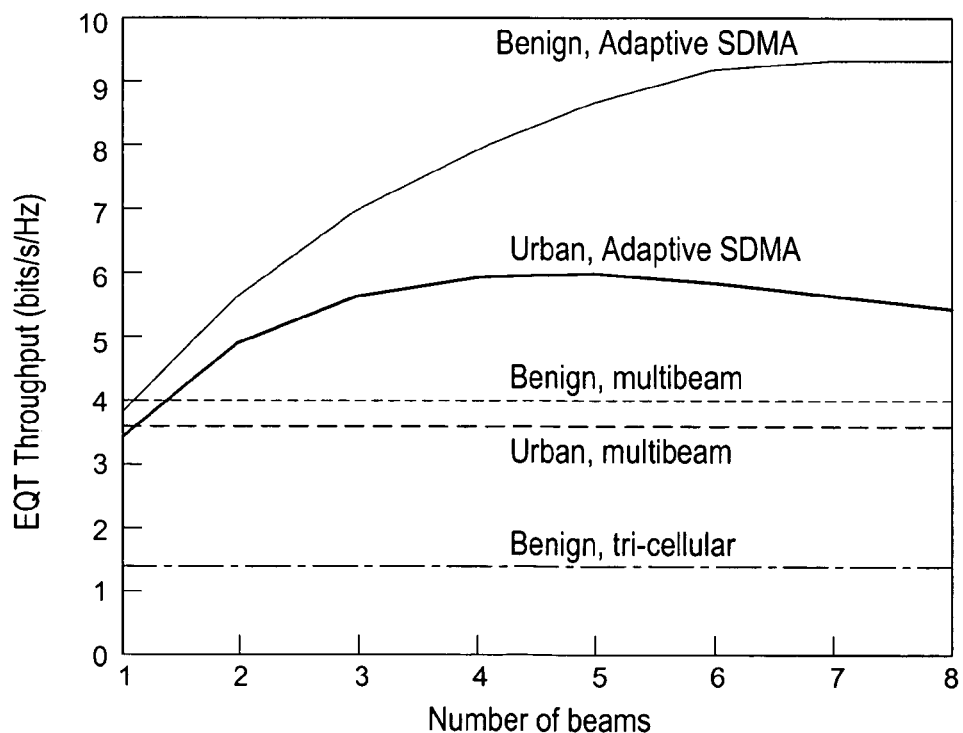
FIG. 11 is a plot of sector throughput versus number of beams in benign and urban environments including 9-beam multibeam and tri-cellular baseline performance.

In FIG. 11 we can compare the performance of adaptive beam SDMA, using our preferred algorithm, with those of a tri-cellular system and a fixed beam system. For the adaptive beam system, the sector throughput is plotted against the number of beams employed. In the proposed system there is no reason why the number of beams should be fixed and, as we see from this graph, there is reason to adapt the number of beams and hence simultaneous users, to the environment. In a benign environment, the optimum operating point for the proposed 8-column array is 7-8 simultaneous users, while in an urban environment, this number is reduced to 5.

In Table II we provide a summary of the performance improvement offered by the proposed system.

TABLE II

SUMMARY PERFORMANCE RESULTS

| SYSTEM | ENVIRONMENT | SECTOR THROUGHPUT (bit/s/Hz) | PERFORMANCE RELATIVE TO TRI-CELLULAR |
| --- | --- | --- | --- |
| Tri-cellular | Benign—no angle spread | 1.4 | 1.0x |
| 9-beam multibeam | Benign—no angle spread | 4.0 | 2.9x |
| 9-beam multibeam | Urban | 3.5 | 2.5x |
| Adaptive SDMA | Benign—no angle spread | 9.4 | 6.7x |
| Adaptive SDMA | Urban | 6.6 | 4.7x |

These spatial processing techniques appear to be a promising avenue for significant, multiplicative, capacity gains as we move towards providing a truly broadband wireless WAN (Wide Area Network). Adaptive beam SDMA offers very significant capacity gains of between 4 and 7 times the tri-cellular baseline. The system is robust to FDD duplex spacing, to challenging propagation environments and to imperfect calibration. In particular, the 'eigenmode with nulling' beamforming algorithm based on the uplink covariance signal matrix, is the preferred algorithm.

What is claimed is:

1. A method of forming beams for communicating over a base station downlink with a plurality of user equipment in a cellular radio network comprising:

(a) receiving transmissions from a plurality of user equipments,
(b) determining an angle of arrival for each respective user equipment transmission,
(c) forming a scheduler set comprising identities of user equipment scheduled for simultaneous transmission in order of a determined angle of arrival for each user equipment in the scheduler set,
(d) partitioning the user equipment in the scheduler set into number of sub-lists, each sub-list being associated with a beam,
(e) selecting a user equipment from each sub-list in turn for co-scheduling, and
(f) processing information derived from the received transmissions for the user equipment identified in the scheduler set to determine beam weightings for the downlink to each user equipment in the scheduler set.

2. A method according to claim 1, wherein a plurality of sets of beam weightings are determined, each set being associated with a respective user in the scheduler set such that for each beam weighting set a directive beam is directed to a single user equipment identified in the scheduler set.

3. A method according to claim 2, wherein the beam weightings for each beam weighting set are determined by taking the inverse of the noise-plus-interference covariance matrix of the user equipments in the scheduler set excluding the said single user and multiplying said matrix with a steering vector.

4. A method according to claim 3, wherein the steering vector is determined as the eigenvector associated with the largest eigenvalue of the covariance matrix relating to said single user equipment.

5. A method according to claim 3, wherein the steering vector is determined using a swept beam algorithm for the said single user equipment.

6. A method according to claim 2, wherein the weightings are arranged such that substantially null power beams are directed to user equipment in the scheduler set other than the said single user equipment.

7. A method according to claim 6, wherein the beam weightings for each beam weighting set are determined by taking the inverse of the noise-plus-interference covariance matrix of the user equipments in the scheduler set (excluding the said single user and multiplying said matrix with a steering vector.

8. A method according to claim 7, wherein the steering vector is determined as the eigenvector associated with the largest eigenvalue of the covariance matrix relating to said single user equipment.

9. A method according to claim 7, wherein the steering vector is determined using a swept beam algorithm for the said single user equipment.

10. A method according to claim 1, wherein the downlink operates on a frequency division duplex basis.

11. A method according to claim 1, including synthesising an overlay beam arranged to cover a predetermined base station sector, and using the overlay beam for pilot and control communications.

12. A method according to claim 1, wherein the base station transmits a pilot signal which is measured by the user equipment and wherein information about the received pilot signal is transmitted back to the base station and used with information about beam weightings to determine a suitable bit rate and transmission method for the downlink to the user equipment.

13. A base station for a cellular radio network configured to determine an angle of arrival for each respective user equipment transmission, the base station comprising a scheduler for determining a scheduler set of user equipments in the cellular radio network, the user equipments being scheduled for simultaneous transmission in order of determined angles of arrival, partitioning the user equipment in the scheduler set into number of sub-lists, each sub-list being associated with a beam, selecting a user equipment in turn from each sub-list for co-scheduling; a beamformer arranged to generate a plurality of beams based on information derived from signals received in the uplink from user equipment in a scheduled set determined by the scheduler, the beamformer being operable to processing information derived from the received transmissions for the user equipment identified in the scheduler set to determine beam weightings for the downlink to each user equipment in the scheduler set; and an antenna operable to transmit the plurality of beams.

14. A base station according to claim 13, wherein the beamformer is arranged to generate an overlay beam covering an entire sector.

15. A base station according to claim 13, wherein the scheduler includes an angle-of-arrival estimator and wherein the said set of user equipment is determined based on estimated respective angles of arrival for each user equipment.

16. A base station according to claim 13, wherein the beamformer is arranged to calculate an average of the received signal covariance matrix.

17. A base station according to claim 16, wherein the beamformer is arranged to calculate the average of the noise-plus-interference covariance matrix of the said determined set of user equipment.

18. A base station according to claim 13, wherein the beamformer is arranged to determine a plurality of sets of beam weightings, each set being associated with a respective user in the scheduler set such that for each beam weighting set a directive beam is directed to a single user equipment identified in the scheduler set.

19. A base station according to claim 18, wherein the beamformer is arranged to determine the beam weightings by taking the inverse of the noise-plus-interference covariance matrix of the user equipments in the scheduler set excluding the said single user and multiplying said matrix with a steering vector.

20. A base station according to claim 13, wherein the antenna is a multi-polar antenna.

21. An adaptive beamformer for a FDD cellular radio downlink comprising a first input for receiving uplink information related to uplink transmissions from user equipment, a beam weightings generator arranged to process the uplink information to generate beam weightings for user equipment, each user equipment being associated with a beam and being selected for co-scheduling by partitioning a scheduler set comprising identities of user equipment scheduled for simultaneous transmission in order of a determined angle of arrival for each user equipment in the scheduler set, the user equipment in the scheduler set being partitioned into a number of sub-lists each sublist being associated with a beam and user equipment from each sub-list being selected in turn for co-scheduling, and a weightings output arranged to output the generated weightings for transmission of adaptive beams by an antenna array.

22. A beamformer according to claim 21, wherein the beam weightings generator is arranged to process the noise-plus-interference covariance matrix.

23. A beamformer according to claim 21, wherein the beam weightings generator is arranged to multiply the inverse of the noise-plus-interference covariance matrix with a steering vector.

24. A beamformer according to claim 23, wherein the steering vector is the eigenvector associated with the maximum eigenvalue of the covariance matrix relating to a particular user equipment.

25. A beamformer according to claim 21, wherein the beam weightings generator is arranged to generate weightings based on an average of the uplink signal properties for each user equipment.

* * * * *